June 26, 1962 H. O. RAMP ETAL 3,041,534

FM GENERATOR CALIBRATION SYSTEM

Filed March 2, 1959

INVENTORS,
HERBERT O. RAMP
HANS SCHMIDL

BY Harry M. Saragovitz

ATTORNEY

United States Patent Office 3,041,534

Patented June 26, 1962

3,041,534
FM GENERATOR CALIBRATION SYSTEM

Herbert O. Ramp, Syracuse, N.Y., and Hans Schmidl, Wall Township, N.J., assignors to the United States of America as represented by the Secretary of the Army Filed Mar. 2, 1959, Ser. No. 796,711
4 Claims. (Cl. 324—79)
(Granted under Title 35, U.S. Code (1952), sec. 266)

The invention described herein may be manufactured and used by or for the Government for governmental purposes, without the payment of any royalty thereon.

The present invention relates to apparatus for measuring unknown frequencies and, more particular, to apparatus for measuring unknown frequencies produced by frequency modulation generators.

It is, therefore, an object of the invention to provide apparatus for measuring a signal frequency produced by a frequency modulation generator.

It is another object of the invention to provide apparatus for calibrating a frequency modulation generator.

A frequency modulation generator is a device adapted to produce a signal frequency which is a function of a driving force, e.g., an electromotive force, applied thereto. In accordance with the invention, there is provided a means for developing such a driving force to activate a frequency modulation generator to consecutively produce in cyclic order a first signal oscillating at an unknown frequency, and a second signal oscillating at another frequency. Further means are provided to combine these signals with a third signal of known frequency generated by a calibrated variable frequency oscillator and to consecutively product therefrom in cyclic order a fourth signal and a fifth signal, the fourth signal oscillating at the difference between the frequencies of the first and third signals and the fifth signal oscillating at the difference between the frequencies of the second and third signals. Finally, an indicating means is provided to indicate the waveform of the output of the above-mentioned combining means; particularly, that waveform corresponding to the case where the known frequency of oscillation of the third signal is exactly equal to the unknown frequency of the first signal. The combining means may comprise a mixer having a suitable filter connected to the output circuit thereof for suppressing all predominate frequencies other than those equal to the difference between the frequencies of the first and third or second and third signals.

Accordingly, it is a feature of the invention that an unknown frequency produced by a frequency modulation generator be measured by comparing it with some known frequency.

It is another feature of the invention that an unknown frequency produced by a frequency modulation generator be measured by activating the generator to produce that frequency and another frequency and combining these frequencies with a known frequency to obtain a waveform which changes suddenly and drastically at the instant the known frequency is exactly equal to the unknown frequency.

It is still another feature of the invention that a frequency modulation generator be calibrated by repeatedly activating the generator with a known driving force to consecutively produce in cyclic order two unknown signal frequencies, combining these frequencies in a mixer or similar device with a known frequency, and filtering the resulting mixer output to obtain a waveform which changes instantaneously and drastically the moment that the known frequency becomes exactly equal to either of the two unknown frequencies.

These and other features and objects of the invention will become apparent by reference to the following description in conjunction with the accompanying drawings in which.

Figure 1:
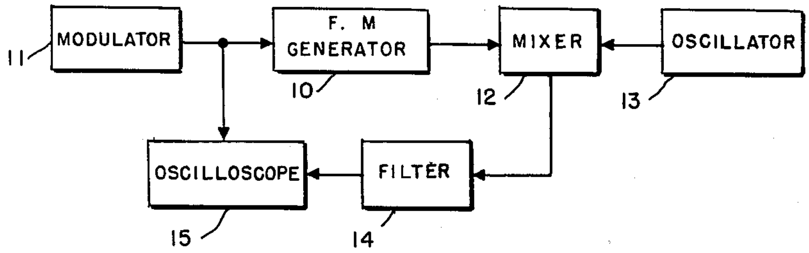
FIG. 1 is a block diagram of an embodiment of the present invention.
Figure 2:
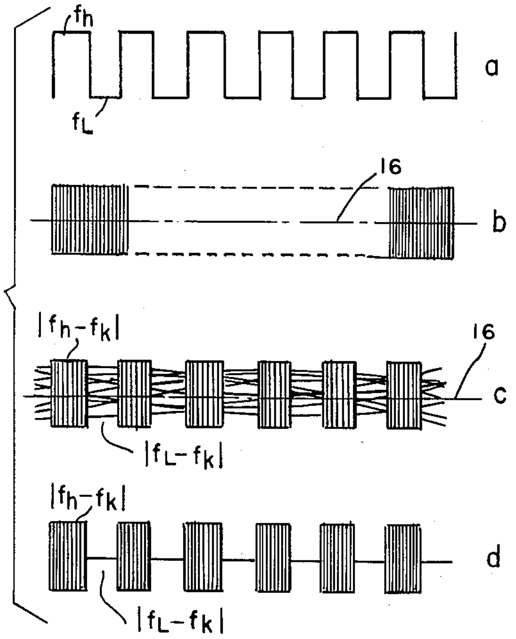
FIG. 2 shows waveforms illustrative of the principles of operation of the invention.

Referring now to FIG. 1, there is shown a frequency modulation generator 10 adapted to produce a signal frequency which is a single valued function of a voltage developed by a modulator 11. The voltage developed by modulator 11 is of the A.C. type and alternately assumes first and second levels of potential to yield a square wave such as that illustrated in FIG. 2A. Although the modulator voltage as illustrated in FIG. 2A assumes its two levels of potential during equal time intervals, i.e., each cycle of the square wave comprises a positive half cycle and a negative half cycle, it will become apparent that it could just as well assume these levels of potential during unequal time intervals. In response to the square wave of FIG. 2A, generator 10 produces a signal frequency $f_h$ during each positive half cycle thereof and another signal frequency $f_L$ during each negative half cycle. In other words, the frequencies $f_h$ and $f_L$ occur consecutively in cyclic order at the repetition rate, i.e., reciprocal of the period of the modulator output. The output of generator 10 comprising the frequencies $f_h$ and $f_L$ is combined in a mixer 12 with a known signal frequency $f_k$ produced by a calibrated variable frequency oscillator 13. Mixer 12 subjects the outputs of generator 10 and oscillator 13 to heterodyne action. As a result of the heterodyne action, the output of mixer 12 contains in addition to other frequencies, the difference frequencies $|f_h-f_k|$ and $|f_L-f_k|$, the vertical bars indicating the absolute rather than signal values of $|f_h-f_k|$ and $|f_L-f_k|$. Like $f_h$ and $f_L$, these difference frequencies occur consecutively in cyclic order at the repetition rate of the modulator output with $|f_h-f_k|$ appearing during the positive half cycle thereof and $|f_L-f_k|$ appearing during the negative half cycle. Connected to the output circuit of mixer 12 is an appropriate filter 14 which passes only those signals which oscillate at either the frequency $|f_h-f_k|$ or $|f_L-f_k|$ and suppresses or bypasses all other signals and any D.C. potential that may be present in the mixer output. The filtered output of mixer 12 is then impressed on the vertical beam deflection input circuit of an oscilloscope 15 to be electronically traced on the fluorescent screen thereof. This is accomplished by synchronizing the time required for the electron beam to horizontally sweep across the oscilloscope screen with the period of the output of modulator 11. If the oscilloscope has a horizontal beam sweep trigger input circuit, such synchronization may be obtained by applying the modulator output to that input circuit as indicated in FIG. 1. As will be evident to anyone skilled in the art, it is then possible to start each horizontal sweep of the beam across the screen with a leading edge of the square wave output of modulator 11 and end the sweep on another leading edge occurring an integral number of cycles thereafter.

The repetition rate of the modulator output is chosen to be somewhat lower than the absolute value of the difference between the frequencies $f_h$ and $f_L$. When the known signal frequency $f_k$ generated by oscillator 13 is far removed from both $f_h$ and $f_L$, the signals in the filtered output of mixer 12 oscillating at the frequencies $|f_h-f_k|$ and $|f_L-f_k|$ go through many of their respective cycles during a time interval equal to that required for th modulator output to go through only one half of its cycle. Consequently, the corresponding oscilloscope picture is entirely made up of closely spaced substantially vertical lines as shown in FIG. 2B. On the other hand, when $f_k$ is in the near vicinity of either $f_h$ or $f_L$, the corresponding oscilloscope picture of the filtered mixer output comprises a series of separate groups of closely spaced substantially vertical lines interwoven with a series of groups of substantially horizontal lines. For example, let it be assumed that $f_k$ is approaching $f_L$ as a limit. When $f_k$ is very near to $f_L$, the difference frequency $|f_L-f_k|$ is much less than the repetition rate of the modulator output. Moreover, the difference frequency $|f_h-f_k|$ is approximately equal to $|f_h-f_L|$, which, as previously stated, is somewhat larger than the repetition rate of the modulator output. As a result, the signal in the filtered output of mixer 12 oscillating at the frequency $|f_L-f_k|$ goes through only a very small portion of its cycle and the signal oscillating at $|f_h-f_k|$ goes through many of its cycles during a time interval equal to that required for the modulator output to go through one half of its cycle. The corresponding oscilloscope picture is shown in FIG. 2C.

So long as $f_k$ is not exactly equal to $f_h$ or $f_L$, the two difference frequencies in the filtered mixer output will both differ from zero so that at all times the vertical beam deflection input circuit of oscilloscope 15 will be energized by a sinusoidal signal. As a result, each line traced by the electron beam as it sweeps across the oscilloscope screen will deviate substantially from the zero trace line, i.e., the line that is traced on the oscilloscope screen when the vertical beam deflection input circuit is not energized, which is indicated in FIGS. 2B and 2C by the broken center-line 16. However, the situation changes suddenly and drastically at the instant $f_k$ becomes exactly equal to $f_h$ or $f_L$. For when $f_k$ is equal to $f_h$ or $f_L$, one of the difference frequencies $|f_h-f_k|$ and $|f_L-f_k|$ in the filtered mixer output and its corresponding signal vanishes. Consequently, the corresponding oscilloscope picture comprises a series of separate groups of closely spaced substantially vertical lines interwoven with a series of zero trace lines. The oscilloscope picture of the filtered output of mixer 12 for the case where $f_k$ is exactly equal to $f_L$ is substantially as shown in FIG. 2D.

Figure 3:
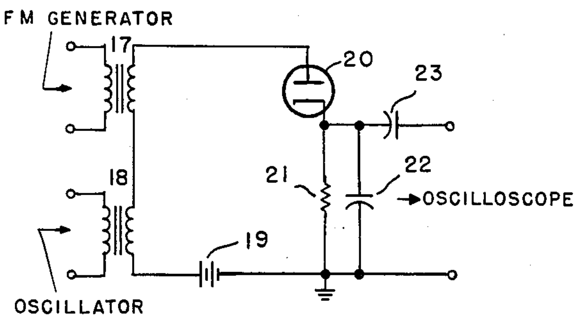
FIG. 3 is a schematic diagram of a mixer and filter circuit suitable for use in practicing the invention.

FIG. 3 shows a circuit arrangement which is particularly adapted to performing the functions of mixer 12 and filter 14 of FIG. 1. Essentially, the circuit comprises a diode mixer and a low pass filter. The diode mixer consists of two transformers 17 and 18, a source 19 of D.C. potential, a diode 20, and a resistor 21. The low pass filter consists of a capacitor 22 connected in parallel with resistor 21 and a coupling capacitor 23. The outputs of the frequency modulation generator 10 and variable frequency oscillator 13 are impressed on the primary windings of transformer 17 and 18, respectively, and coupling capacitor 23 is connected to the vertical beam deflection input circuit of oscilloscope 15. It can readily be shown (T. S. Gray; Applied Electronics; John Wiley & Sons, Inc.; New York; 1943; 738–742; 2nd ed.) that when the generator 10 produces the frequency $f_h$ and oscillator 13 the frequency $f_k$, the resulting output of the diode mixer at resistor 21 will comprise a D.C. potential and the frequencies $f_h$, $f_k$, $2f_h$, $2f_k$, $|f_h+f_k|$, and $|f_h-f_k|$. Likewise, when generator 10 produces the frequency $f_L$ and oscillator 13 the frequency $f_k$, the resulting output at resistor 21 comprises a D.C. potential and the frequencies $f_L$, $f_k$, $2f_L$, $2f_k$, $|f_L+f_k|$, $|f_L-f_k|$. Since $|f_L-f_k|$ and $|f_h-f_k|$ will be the lowest frequencies appearing in the output of the diode mixer, provided of course that $f_k$ is sufficiently close to both $f_h$ and $f_L$, all of the other frequencies can readily be prevented from reaching the oscilloscope 15 by choosing a suitable value of capacitance for capacitor 22. The capacitor 23, of course, serves to prevent the D.C. potential in the diode mixer output from reaching oscilloscope 15.

As an example of how the invention might be utilized to calibrate a frequency modulation generator, let it be assumed that it is desired to calibrate generator 10 over the frequency range from 192 to 208 kilocycles per second. A suitable repetition rate for the square wave output of modulator 11 would be 200 cycles per second. The highest difference frequency that needs to be passed by filter 14 in order to provide an indication of the type shown in FIG. 20 for all frequencies in the given frequency range is 16 kilocycles per second. Moreover, all frequencies above 192 kilocycles per second must be prevented from reaching oscilloscope 15. Consequently, the capacitance of capacitor 22 might, for instance, well be chosen to provide substantial attenuation of all signals oscillating at frequencies above 50 kilocycles. If modulator 11 is calibrated, an accurate calibration curve can easily be obtained for generator 10 by repeatedly adjusting the amplitude of the modulator output to different known values and determining the pair of frequencies produced by generator 10 with each value of amplitude in accordance with the principles heretofore presented.

In view of the fact that numerous modifications of the above described apparatus may be devised by those skilled in the art without departing from the spirit and scope of the invention as defined by the appended claims, it is to be understood that all matter contained in the above description and accompanying drawings is merely illustrative of the principles of the invention and is not to be considered in the limiting sense.

What is claimed is:

1. Apparatus for measuring the frequency of an electrical signal comprising, a frequency modulation generator, means for activating said generator to consecutively produce in cyclic order a first signal oscillating at an unknown frequency and a second signal oscillating at another frequency, a calibrated variable frequency oscillator for producing a third signal oscillating at a known frequency, means for combining the outputs of said variable frequency oscillator and said frequency modulation generator to consecutively produce in cyclic order a fourth signal oscillating at the difference between the frequencies of oscillation of said third and first signals and a fifth signal oscillating at the difference between the frequencies of oscillation of said third and second signals, and means responsive to said generator activating means and combining means for indicating the waveform of the output of said combining means.

2. Apparatus for measuring the frequency of an electrical signal comprising, a modulator to produce a square wave of voltage, a frequency modulation generator responsive to the output of said modulator to consecutively produce in cyclic order at the repetition rate of said square wave a first signal oscillating at an unknown frequency and a second signal oscillating at another frequency, a calibrated variable frequency oscillator for producing a third signal oscillating at a known frequency, means for combining the outputs of said variable frequency oscillator and said frequency modulation generator to consecutively produce in cyclic order at the repetition rate of said square wave a fourth signal oscillating at the difference between the frequencies of oscillation of said third and first signals and a fifth signal oscillating at the difference between the frequencies of oscillation of said third and second signals, and means responsive to said modulator signal and said combining means for indicating the waveform derived from said combining means whereby when either said fifth signal or said fourth signal is equal to said known frequency signal, only a single waveform is indicated.

3. Apparatus according to claim 2 wherein said indicating means comprises an oscilloscope having a vertical beam deflection input circuit and a horizontal sweep trigger input circuit, the horizontal sweep trigger input circuit being energized by the output of said modulator and the vertical beam deflection input circuit being energized by the output of said combining means.

4. Apparatus for measuring the frequency of an electrical signal comprising, a frequency modulation generator, means for activating said generator to produce in cyclic order a first signal oscillating at an unknown frequency and a second signal oscillating at another frequency, a calibrated variable frequency oscillator for producing a third signal oscillating at a known frequency, a serially connected mixer and low pass filter responsive to the outputs of said variable frequency oscillator and frequency modulation generator to provide heterodyne action and consecutively produce therefrom in cyclic order a fourth signal oscillating at the difference between the frequencies of oscillation of said third and first signals and a fifth signal oscillating at the difference between the frequencies of oscillation of said third and second signals, and mean responsive to said generator activating means and said serially connected mixer and low pass filter for electronically indicating the waveform of the output of said serially connected mixer and low pass filter.

References Cited in the file of this patent

UNITED STATES PATENTS

| | | |
|---|---|---|
| 2,178,225 | Diehl | Oct. 31, 1939 |
| 2,272,768 | Crosby | Feb. 10, 1942 |
| 2,304,969 | Trevor | Dec. 15, 1942 |
| 2,369,011 | Braden | Feb. 6, 1945 |
| 2,419,527 | Bartelink | Apr. 29, 1947 |
| 2,419,984 | Boothroyd | May 6, 1947 |
| 2,499,755 | Hunt | Mar. 7, 1950 |
| 2,557,817 | Dutton | June 19, 1951 |
| 2,640,106 | Wilson et al. | May 26, 1953 |
| 2,678,427 | Smith | May 11, 1954 |
| 2,896,074 | Newsom et al. | July 21, 1959 |

OTHER REFERENCES

"SHF Heterodyne Frequency Meter," article in Electronics, April 1947; pages 134–137.

"A Calibrating Method for Microwave Wavemeters," Bell Telephone System Technical Publication; monograph B-1484, by L. E. Hunt, copyright 1947.